United States Patent [19]

Brown

[11] 4,247,237
[45] Jan. 27, 1981

[54] FREE STANDING HONEYCOMB LOAD SPACER

[75] Inventor: Ronald L. Brown, Sacramento, Calif.

[73] Assignee: Down River International, Inc., Sacramento, Calif.

[21] Appl. No.: 45,825

[22] Filed: Jun. 5, 1979

[51] Int. Cl.³ .......................... B60P 7/14; B60P 7/16; B61D 45/00
[52] U.S. Cl. .................................... 410/154; 410/121
[58] Field of Search .............. 410/121, 122, 129, 140, 410/154, 155

[56] References Cited

U.S. PATENT DOCUMENTS

| 3,389,665 | 6/1968 | Kauffman | 410/154 |
| 3,405,659 | 10/1968 | Hees | 410/154 |
| 3,581,675 | 6/1971 | Kauffman | 410/154 |
| 3,593,671 | 7/1971 | Bramlett | 410/154 |
| 3,850,112 | 11/1974 | Jaski | 410/154 |
| 4,109,587 | 8/1978 | Jansen, Jr. | 410/154 |

*Primary Examiner*—Howard Beltran
*Attorney, Agent, or Firm*—Harness, Dickey & Pierce

[57] ABSTRACT

A free standing cargo spacer which is adapted to be assembled in situ from a honeycomb body and an initially flat panel. The honeycomb body is shipped collapsed and is expanded during assembly. The panel is bent during assembly to extend partially around the expanded honeycomb, and is interengaged therewith by means of interfittable tabs and slots to support and maintain the expanded form of the honeycomb and hold the panel in bent form.

3 Claims, 9 Drawing Figures

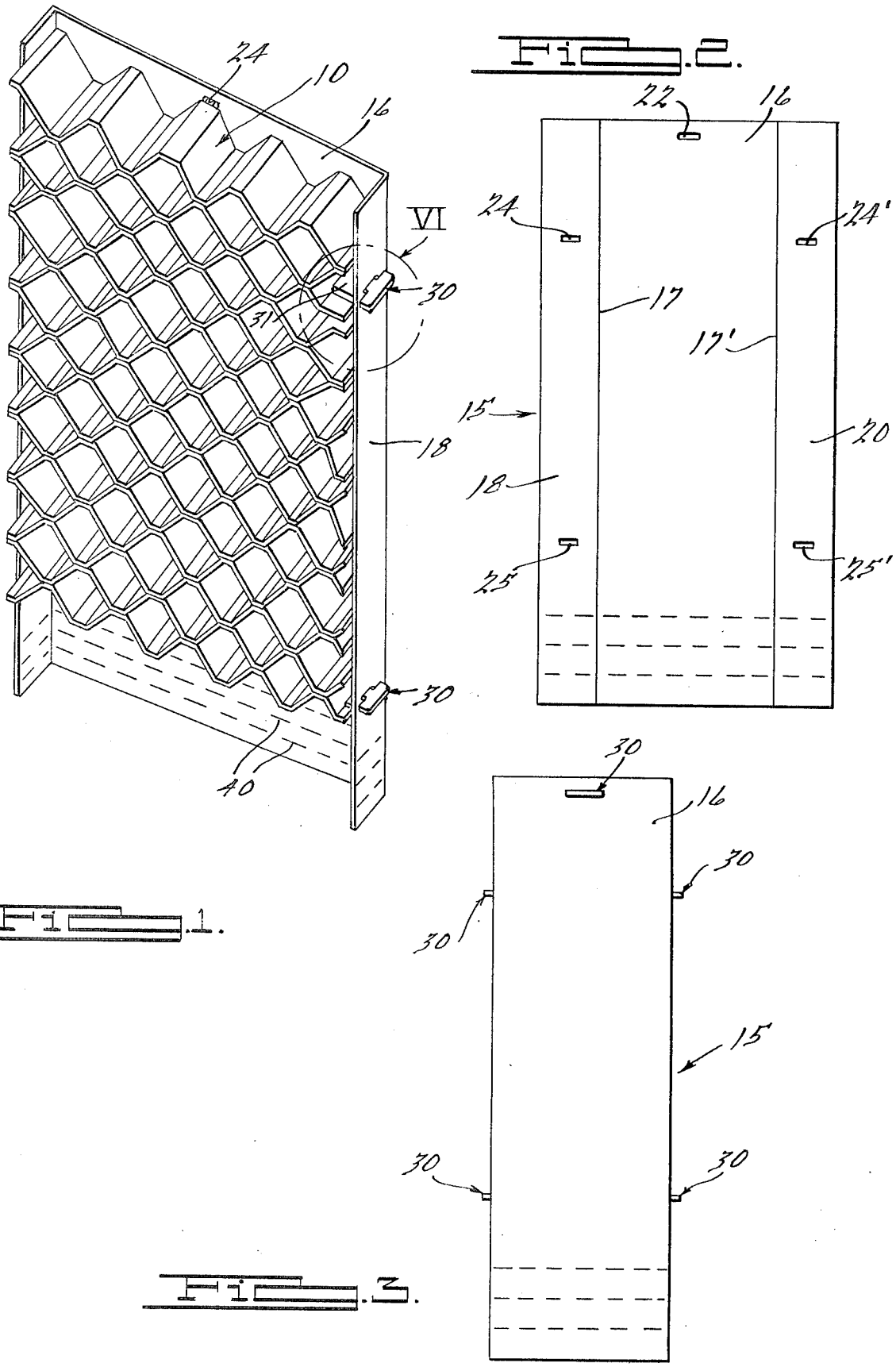

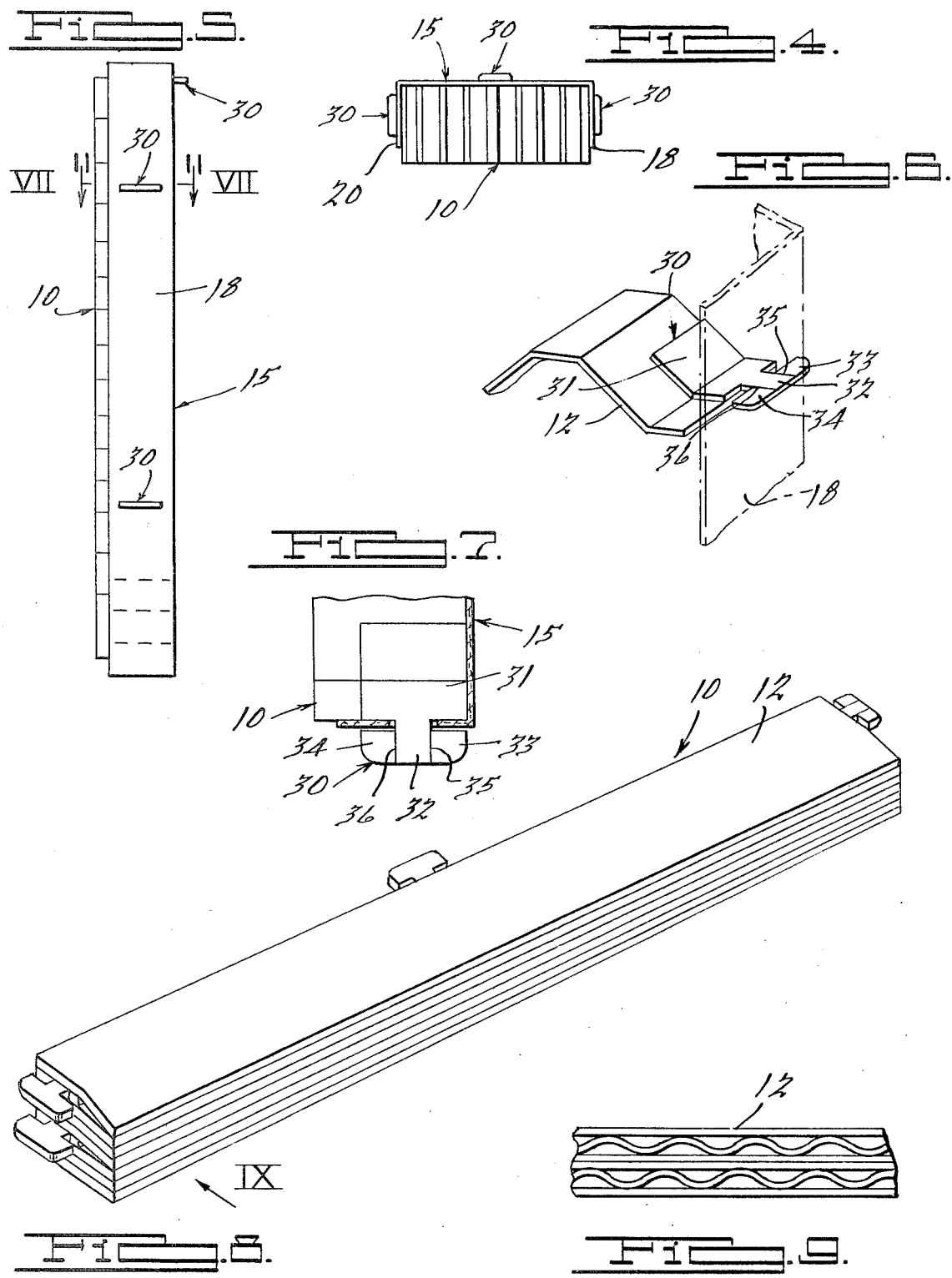

FREE STANDING HONEYCOMB LOAD SPACER

BACKGROUND OF THE INVENTION

Load spacers for use in holding cargo against shifting in transit are in many instances constructed of a honeycomb structure formed of corrugated paperboard and adapted to be shipped to the user and to be stored in a collapsed form, and to be expanded simply by pulling open when ready for use. Various devices and arrangements have been employed to maintain such honeycomb structures in the expanded condition and to support them during use. Typically such spacers have been suspended or fastened in position either by attachment to the cargo itself, or by attachment to the truck or railcar body, freight container or the like. Such attachment entails the labor of a nailing or other fastening operation which is sometimes inconvenient to apt to be inadequately performed. Also, such special fastenings entail cost, delay, and other problems not only in the installation thereof, but also in the subsequent removal of the spacers and their supporting means.

The overall objective of the present invention is to provide an improved load spacer which preserves such advantages of the aforementioned known types of expandable load spacers as low initial cost, inexpensive shipment from manufacturer to user, and minimum storage space requirements, but which is free standing and requires no attachment to either the body or the cargo during use, and which is easily and quickly removable, leaving no fasteners, nails or other parts requiring separate removal or disposition.

Other objects and advantages of the invention will be apparent to those skilled in the art upon consideration of the present disclosure in its entirety.

BRIEF DESCRIPTION OF THE FIGURES OF DRAWING

FIG. 1 is a perspective view of a load spacer constructed in accordance with the present invention showing the same assembled and ready for use;

FIG. 2 is an elevational view of a supporting panel blank of somewhat different proportions and on a smaller scale, from the rear;

FIG. 3 is a rear elevational view of an assembly corresponding to that shown in FIG. 1 but of narrower proportioning similar to FIG. 2;

FIG. 4 is a top plan view of the same;

FIG. 5 is a side elevational view;

FIG. 6 is a perspective view on a larger scale of the area designated by the circle VI in FIG. 1;

FIG. 7 is a fragmentary detailed sectional view on line VII—VII of FIG. 5;

FIG. 8 is a perspective view of the honeycomb filler unit in the collapsed condition; and FIG. 9 is an enlarged fragmentary elevational view looking in the direction indicated by the arrow IX in FIG. 8, of two lamina of the collapsed filler unit.

DETAILED DESCRIPTION OF PREFERRED EMBODIMENT

Reference character 10 designates a honeycomb-type filler assembly the general construction of which may conform to that of the honeycomb assemblies shown, for example, in U.S. Pat. Nos. 3,581,675 and 3,593,671. Such honeycomb structures, which are well-known in the art, are formed of a plurality of identical strips of corrugated cardboard as 12, having straight parallel edges, each intermediate strip being secured at uniformly spaced distances alternately to the strip above and the strip below the same in such manner that, by virtue of the incorporated of hinge lines at the areas of securance, the assembled strips can be extended to provide a honeycomb-like filler. Such honeycombs are relatively rigid in the direction corresponding to the axes of the cells, but prior to expansion, the honeycomb assembly can be shipped and stored with the strips collapsed to closely stacked condition, as shown in FIG. 8. It will be recognized that strips of different length may be used, to provide fillers of variant width, and that the width of the strips, in a direction perpendicular to the length of the individual strips, is also variable to provide fillers of different thicknesses. All of the strips for a given filler are of course of like dimensions so that the expanded honeycomb filler has flat and parallel front and rear faces.

In accordance with the present invention, a supporting wrapper panel 15 is provided, also constructed in my preferred embodiment of corrugated paperboard, although other materials may be used, as will be recognized by those skilled in the art. The panel 15 may be initially flat for economy in shipment and storage, but is provided with parallel hinge lines as 17, 17' spaced apart a distance corresponding to the width of the expanded filler for which the panel is designed. Walls 18 and 20 extending from the hinge lines 17, 17' respectively, are of a width which conforms to or is somewhat less than the thickness of the honeycomb assembly. The panel 15 is thus designed to be wrapped around three sides of the expanded honeycomb as shown in FIG. 1, with its central wall portion 16 overlying one face of and substantially conforming in size to the expanded honeycomb, and its walls 18 and 20 overlying the sides of the expanded honeycomb, as indicated. Near the top of wall 16 and centered transversely with respect thereto a horizontal slot-like opening 22 is provided, and two similar vertically spaced slot-like openings 24, 25 and 24', 25' are provided in the sidewalls 18 and 20 respectively.

Means are provided for securing the expanded honeycomb filler and the panel in the assembled configuration. Such means comprises tab or tongue members, generally designated 30, constructed as shown in FIG. 7, having supporting sections 31 secured to the strips and having projecting tab portions each of which consists of a central tongue section 32 forming a rigid extension of section 31 and hinged tab or flap sections 33, 34, joined to tongue sections 32 along parallel hinge lines 35, 36. The tab members 30 are secured to the filler strips in such positions as to be aligned with the slots 22, 24, 25, 24' and 25' when the filler is expanded and fitted into the panel member 15, after the latter is bent to generally U-section, as shown in FIG. 4. When so aligned, the flap sections 33, 34 are adapted to be folded along the hinge lines 35,36 to lie flat against tongue section 32, at which time they can be projected through the aligned slots, whereafter the winglike flap sections 33, 34 swing outwardly beyond the ends of the slots to overlie the outer walls of the panel, thereby holding the filler in its expanded condition and at the same time maintaining the walls 18, 20 in parallel relation and closely members 30 are initially flat and do not interfere with collapsing of the entire filler assembly with the tab units installed thereupon for shipping and storage, as shown in FIG. 8. A moisture-resistant glue is preferably used to secure the strips to one another and the tab members to the strips.

The panel assembly is inherently rigid in the vertical direction, and by virtue of the increased rigidity resulting from the fact that after assembly, the wall portions 18, 20 thereof are perpendicular to the central wall 16, the panel parts such rigidity to the entire assembly that it is adapted to stand in a vertical position on a flat floor, as shown in FIG. 1, without likelihood that it will be injured by vertical forces normally encountered. Thus the assembled units may simply be pushed or slid into position between cargo boxes or other cargo elements, or between cargo elements and the walls of a railcar or other body in which freight is being shipped, to fill voids which otherwise would permit shifting of the cargo.

As indicated at 40 in FIG. 1, scored or weakened lines are preferably provided transversely near one end of panel 15, making it convenient to shorten the panel at the point of use when necessary.

The detailed description of the preferred embodiment and the accompanying drawings have been furnished in compliance with the statutory requirement to set forth the best mode contemplated by the inventor of carrying out the invention. The prior portions consisting of the "Abstract of the Disclosure" and "Background of the Invention" are furnished without prejudice to comply with administrative requirements of the Patent and Trademark Office.

While a preferred embodiment of the invention has been described herein, it will be appreciated that various modifications and changes may be made without departing from the spirit and scope of the appended claims.

What is claimed is:

1. A cargo spacer adapted to be self-supporting when standing on a floor in a vertical position, comprising an expansible honeycomb-type filler formed of stacked flat elongated strips which are more resistant to deformation by forces applied thereto edgewise in a direction perpendicular to the length of the strip than to forces perpendicular to the plane of the strip, the cells defined by said honeycomb having their axes extending in said direction, characterized by the combination which includes a wrapper panel having a flat wall proportioned to overlie the ends of the cells defined by the honeycomb, said panel also having sidewalls bendable to extend perpendicularly from opposite side edges of said flat wall adjacent the sides of the expanded honeycomb filler, whereby the wrapper panel is of generally U-section when the side walls are so bent, and fastening means for securing each of said side walls of the wrapper panel to the filler when the latter is expanded, whereby the panel holds the filler in the expanded condition and the fastening means holds the side walls of the panel perpendicular to said flat wall.

2. A cargo spacer as defined in claim 1 including coacting interengageable abutment portions carried by certain of said strips and by said side walls and defining said fastening means.

3. A cargo spacer as defined in claim 1 wherein said fastening means comprise foldable tongues fast upon and extending from certain of said strips and slotted openings in said side walls, through which openings said tongues are projectable when the filler is expanded and the side walls bent to said perpendicular position.

* * * * *